US012151803B2

(12) United States Patent
Moore

(10) Patent No.: US 12,151,803 B2
(45) Date of Patent: Nov. 26, 2024

(54) PRELOADED TORQUE SHAFT AND THE FLIGHT CONTROL DRIVELINE MADE THEREWITH

(71) Applicant: Moog Inc., East Aurora, NY (US)

(72) Inventor: Christopher A. Moore, Yorba Linda, CA (US)

(73) Assignee: Moog Inc., East Aurora, NY (US)

( * ) Notice: Subject to any disclaimer, the term of this patent is extended or adjusted under 35 U.S.C. 154(b) by 258 days.

(21) Appl. No.: 17/612,622

(22) PCT Filed: May 22, 2020

(86) PCT No.: PCT/US2020/034240
§ 371 (c)(1),
(2) Date: Nov. 19, 2021

(87) PCT Pub. No.: WO2021/034362
PCT Pub. Date: Feb. 25, 2021

(65) Prior Publication Data
US 2022/0242555 A1    Aug. 4, 2022

(51) Int. Cl.
*B64C 13/32* (2006.01)
*B29D 99/00* (2010.01)
*F16C 3/02* (2006.01)

(52) U.S. Cl.
CPC .......... *B64C 13/32* (2013.01); *B29D 99/0025* (2013.01); *F16C 3/023* (2013.01);
(Continued)

(58) Field of Classification Search
CPC ................. B64C 13/32; F16C 2229/00; Y10T 29/49336; Y10T 29/49339; Y10T 29/49947
See application file for complete search history.

(56) References Cited

U.S. PATENT DOCUMENTS 2,516,406 A    7/1950  Moyer et al.
4,127,080 A    11/1978 Lakiza et al.
(Continued)

FOREIGN PATENT DOCUMENTS

EP    0145810 A1    6/1985
EP    1380500 A2    1/2004
(Continued)

*Primary Examiner* — Brady W Frazier
*Assistant Examiner* — Anna L. Gordon
(74) *Attorney, Agent, or Firm* — Harter Secrest & Emery LLP

(57) ABSTRACT

Presented are a method and apparatus for an aircraft flight surface actuation system including a motor having an output shaft. A gearbox is coupled with the output shaft, whereby a first driving force output via the motor is converted to a second driving force. A torque shaft assembly is driveably coupled with the gearbox. The torque shaft assembly includes a first tube, a second tube located at least partially through the first tube and located coaxial therewith, wherein the first tube comprises an axial preload operable to mitigate lateral deflection, and wherein the first tube comprises a torsional preload operable to mitigate torsional deflection. In addition, the aircraft flight surface actuation system includes an eccentric cam mechanism driveably coupled with the torque shaft assembly, and a flight surface coupled with the eccentric cam mechanism.

9 Claims, 7 Drawing Sheets

(52) U.S. Cl.
CPC ...... *F16C 2208/02* (2013.01); *F16C 2226/40* (2013.01); *F16C 2226/62* (2013.01); *F16C 2229/00* (2013.01); *F16C 2326/43* (2013.01)

(56) References Cited

U.S. PATENT DOCUMENTS

| | | | |
|---|---|---|---|
| 4,498,647 A * | 2/1985 | Boehringer | B64C 9/02 |
| | | | 244/99.3 |
| 4,812,348 A | 3/1989 | Rau | |
| 5,590,743 A | 1/1997 | Houmard et al. | |
| 6,076,767 A | 6/2000 | Farley et al. | |
| 6,802,475 B2 | 10/2004 | Davies et al. | |
| 6,863,763 B2 | 3/2005 | Lee et al. | |
| 7,037,076 B2 | 5/2006 | Jacot et al. | |
| 7,419,435 B2 | 9/2008 | Borges et al. | |
| 9,518,601 B2 | 12/2016 | Shippy et al. | |
| 9,518,611 B2 | 12/2016 | Gillett | |
| 9,937,671 B2 | 4/2018 | Larson | |
| 2004/0004163 A1 * | 1/2004 | Davies | B64C 13/32 |
| | | | 244/217 |
| 2004/0082394 A1 * | 4/2004 | Lee | F16C 3/026 |
| | | | 464/182 |
| 2012/0319445 A1 * | 12/2012 | Zolno | B60N 2/0296 |
| | | | 74/665 F |
| 2013/0327865 A1 * | 12/2013 | Boast | B02C 2/047 |
| | | | 241/278.1 |
| 2014/0260722 A1 | 9/2014 | Kopp et al. | |
| 2015/0081102 A1 | 3/2015 | Kopp | |
| 2015/0111650 A1 | 4/2015 | Kohuth et al. | |
| 2015/0217855 A1 | 8/2015 | Davies | |
| 2016/0186614 A1 * | 6/2016 | Paulino | F01D 25/243 |
| | | | 415/211.2 |
| 2017/0227045 A1 * | 8/2017 | Katayama | B29C 65/48 |
| 2017/0227059 A1 | 8/2017 | Kamikawa | |
| 2018/0100538 A1 | 4/2018 | Hyson et al. | |

FOREIGN PATENT DOCUMENTS

| | | | | |
|---|---|---|---|---|
| GB | 700405 A | | 12/1953 | |
| GB | 1244941 A | | 9/1971 | |
| GB | 1546342 A | | 5/1979 | |
| KR | 100740592 B1 | | 7/2007 | |
| WO | WO 9009314 A1 * | | 8/1990 | ............... F16D 9/08 |
| WO | WO-2019035395 A1 * | | 2/2019 | |

* cited by examiner

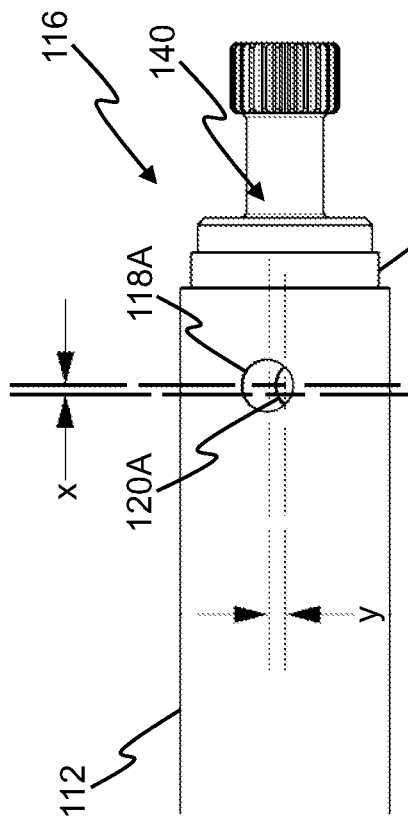
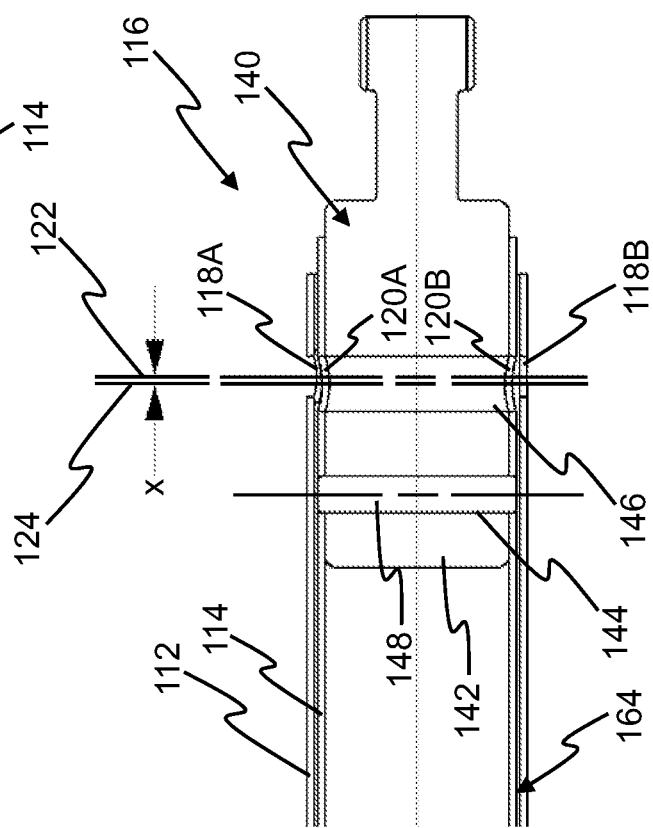

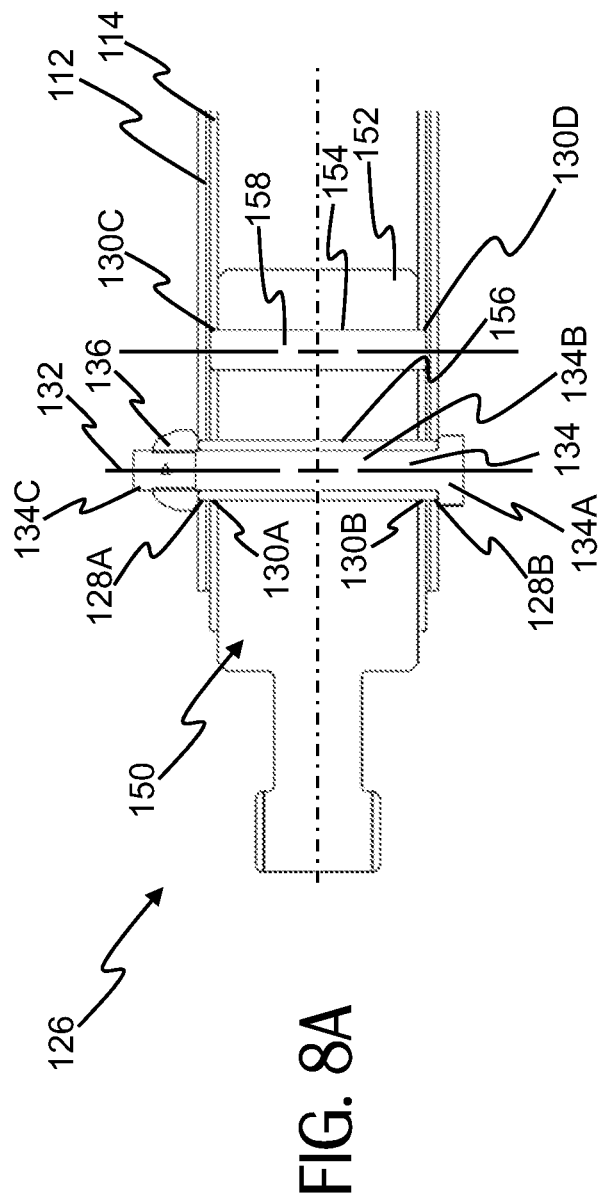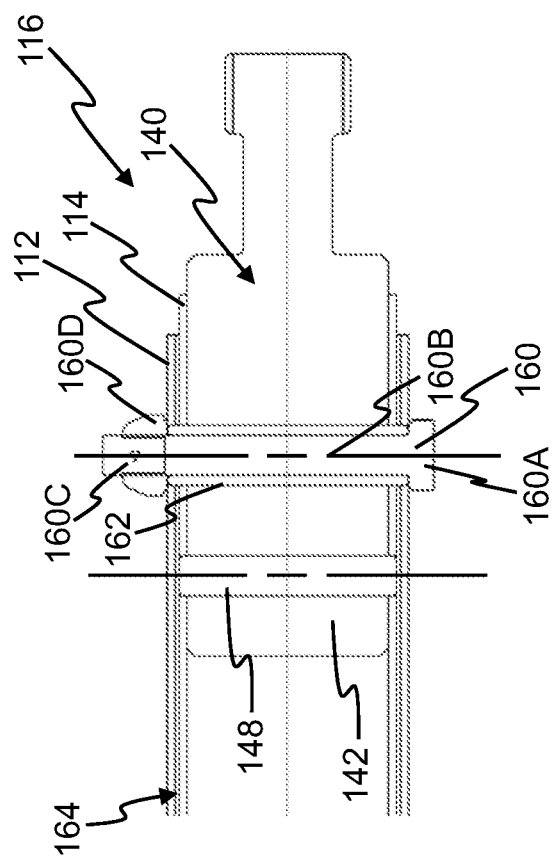

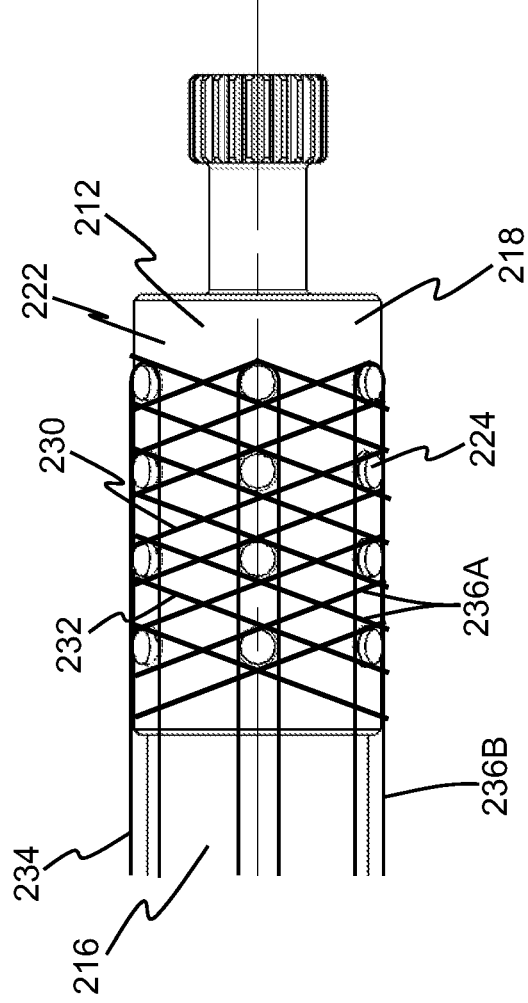
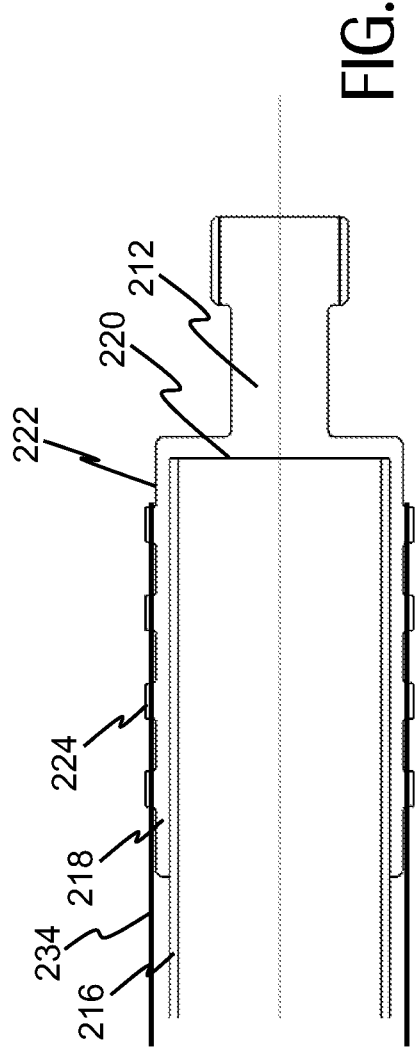

PRELOADED TORQUE SHAFT AND THE FLIGHT CONTROL DRIVELINE MADE THEREWITH

TECHNICAL FIELD

The present disclosure relates generally to aircraft utility and flight control surface drivelines and more particularly to torque shafts operable in actuable aircraft parts.

BACKGROUND

Aircraft wings typically comprise a series of actuable control surface elements. Aircraft utilize flight control surfaces, such as flaps, slats, and ailerons, to change the lift produced by flight surfaces and to control flight dynamics. These control surfaces are moveable relative to the fixed wing structure to alter the aerodynamic characteristics thereof. For example, during takeoff flaps may be actuated to alter the shape of an airfoil and increase the lift generated thereby.

Aircraft may utilize control surface actuation assemblies to change the position of control surfaces. Typically, control surfaces are actuated via an actuator located at one or both spanwise ends of the fixed structure. In many designs, the envelope within a fixed structure, such as an aircraft wing, for housing the control surface actuation assemblies is limited. Additionally, other mechanical systems must share space within the wing.

Therefore, the present disclosure provides a torque shaft, and the control surface actuation assembly made therewith, that operates with reduced, or eliminated, axial, torsional, and/or lateral deflection under applied load.

SUMMARY

The present disclosure provides for an aircraft flight surface actuation system and a method of producing an aircraft flight surface actuation system torque tube assembly. In an exemplary embodiment, an aircraft flight surface actuation system includes a motor (108) having an output shaft (106). A gearbox (104) is coupled with the output shaft, whereby a first driving force output via the motor (108) is converted to a second driving force. A torque shaft assembly (110) is driveably coupled with the gearbox. The torque shaft assembly includes a first tube (112), a second tube (114) located at least partially through the first tube and located coaxial therewith, wherein the first tube comprises an axial preload operable to mitigate lateral deflection, and wherein the first tube comprises a torsional preload operable to mitigate torsional deflection. In addition, the aircraft flight surface actuation system includes an eccentric cam mechanism (102) driveably coupled with the torque shaft assembly, and a flight surface coupled with the eccentric cam mechanism.

In another exemplary embodiment, a method of producing an aircraft flight surface actuation system torque tube assembly (110) includes providing a first shaft (112) having a first end (116), a second end (126), a first hole (118A) located adjacent to the first end of the first shaft, and a second hole (128A) located adjacent to the second end of the first shaft. Providing a second shaft (114) having a first end (116), a second end (126), a third hole (120A) located adjacent to a first end of the second shaft, and a fourth hole (130A) located adjacent to the second end of the second shaft, wherein an axial distance between centers of the third and fourth holes is greater than an axial distance between centers of the first and second holes. The method additionally including inserting the second shaft at least partially through the first shaft, wherein the first and third holes align. Inserting a first pin (160) through the first and third holes, whereby the first end of the first shaft is driveably coupled with the first end of the second shaft. Further, loading the first shaft in an axial direction relative to the second shaft until the second and fourth holes align, whereby an axial preload is applied to the first shaft, and inserting a second pin (134) through the second and fourth holes, whereby the second end of the first shaft is driveably coupled with the second end of the second shaft.

In another exemplary embodiment, a method of producing an aircraft flight surface actuation system torque tube assembly (210) includes providing a tube (216), a first end-coupling (212) coupled with the tube (216), and a second end-coupling (214) coupled with the tube opposite the first end-coupling. The method additionally includes applying a torsional load to the tube, winding a first plurality of fibers (230) about the first and second end-couplings and the tube in a first helical direction, winding a second plurality of fibers (232) about the first and second end-couplings and the tube in a second helical direction, wherein the first and second plurality of fibers comprise a first composite (236A), and curing the first composite while the tube is subject to the torsional load. The method further includes, applying a compressive load to the tube, winding a third plurality of fibers (234) about the first and second end-couplings and the tube in an axial direction, wherein the third plurality of fibers comprise a second composite (236B), and curing the second composite while the tube is subject to the compressive load.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

FIG. 6 shows a portion of the torque shaft assembly according to the embodiment illustrated in FIG. 4.

FIG. 7 shows a cross-sectional view of a portion of the torque shaft assembly according to the embodiment illustrated in FIG. 6.

FIG. 8A shows a cross-sectional view of a portion of the torque shaft assembly according to the embodiment illustrated in FIG. 4.

FIG. 8B shows a cross-sectional view of another portion of the torque shaft assembly according to the embodiment illustrated in FIG. 4.

FIG. 10 shows a portion of the torque shaft assembly according to the embodiment illustrated in FIG. 9.

FIG. 11 shows a cross-sectional view of a portion of the torque shaft assembly according to the embodiment illustrated in FIG. 10.

DETAILED DESCRIPTION

Figure 1:
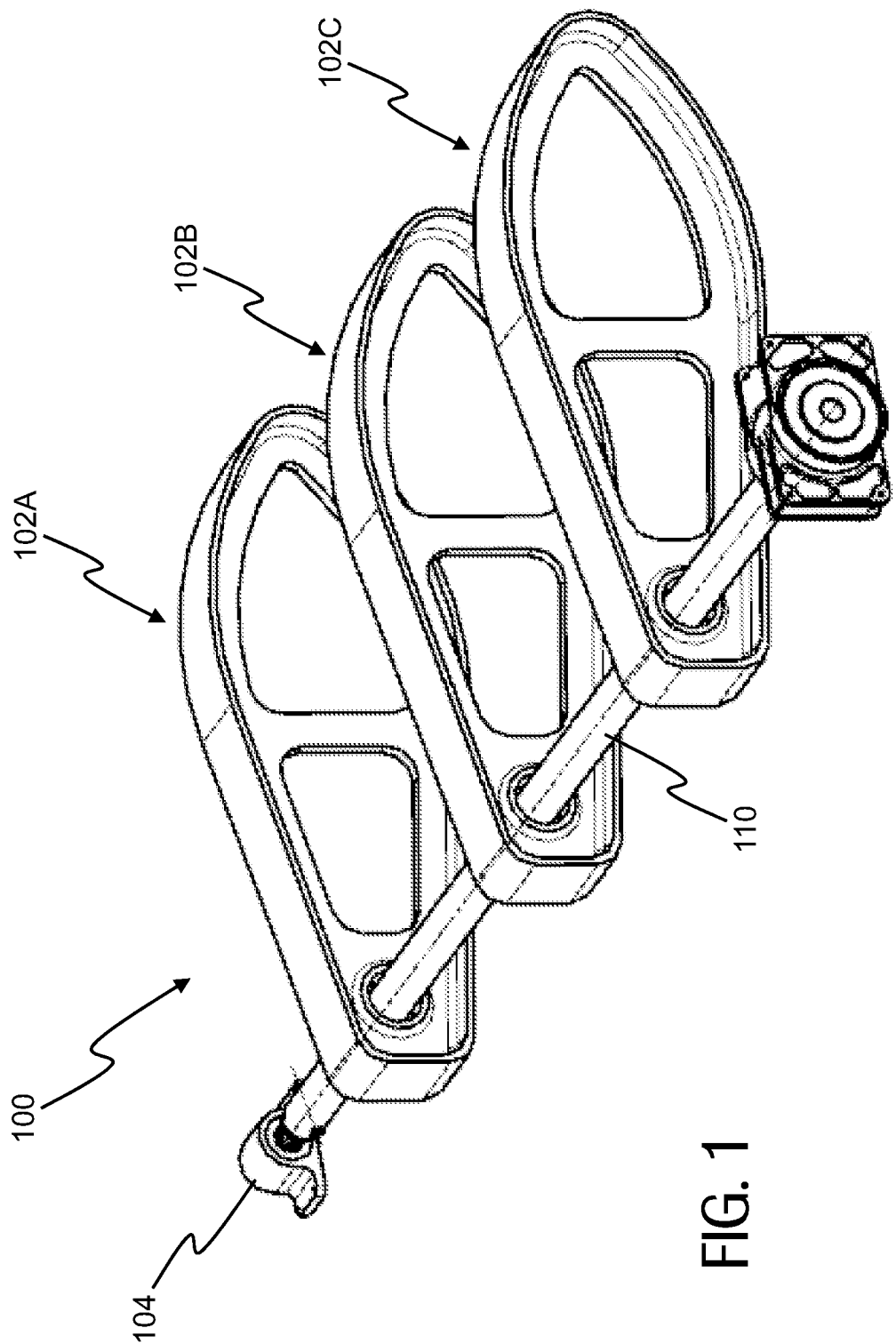
FIG. 1 shows a perspective view of a control surface actuation assembly according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application. As used in the following specification, terms of orientation such as "horizontal," "vertical," "left," "right," "up," and "down," as well as adjectival and adverbial derivatives thereof, (e.g., "horizontally," "rightwardly," "upwardly," etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Figure 2:
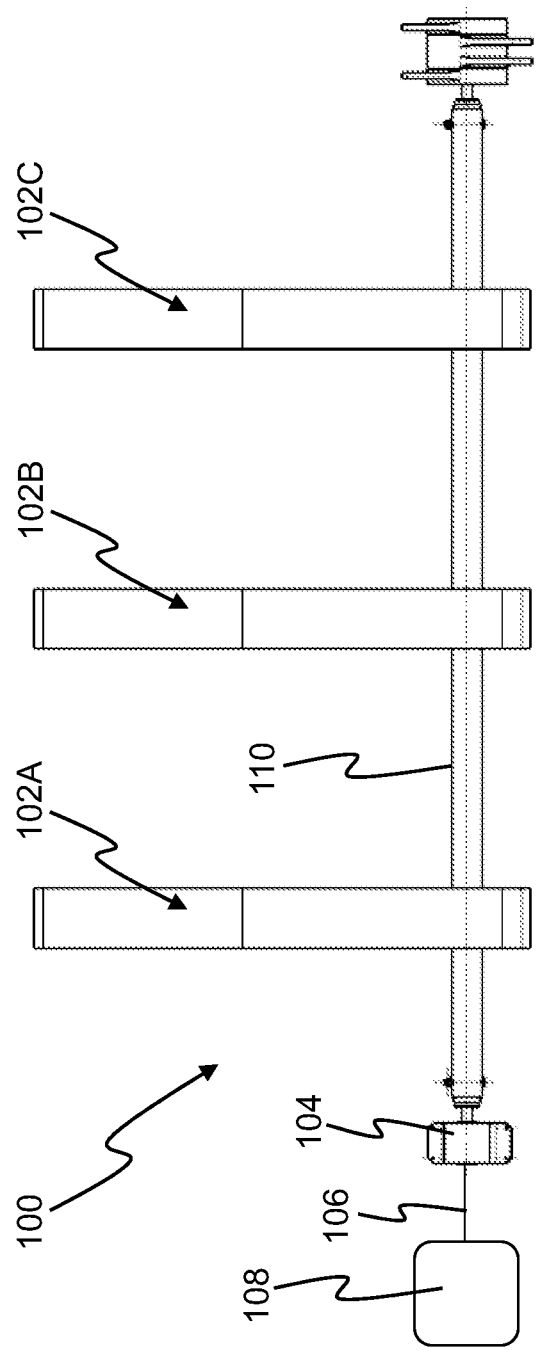
FIG. 2 shows a top view of the control surface actuation assembly according to the embodiment illustrated in FIG. 1.
Figure 3:
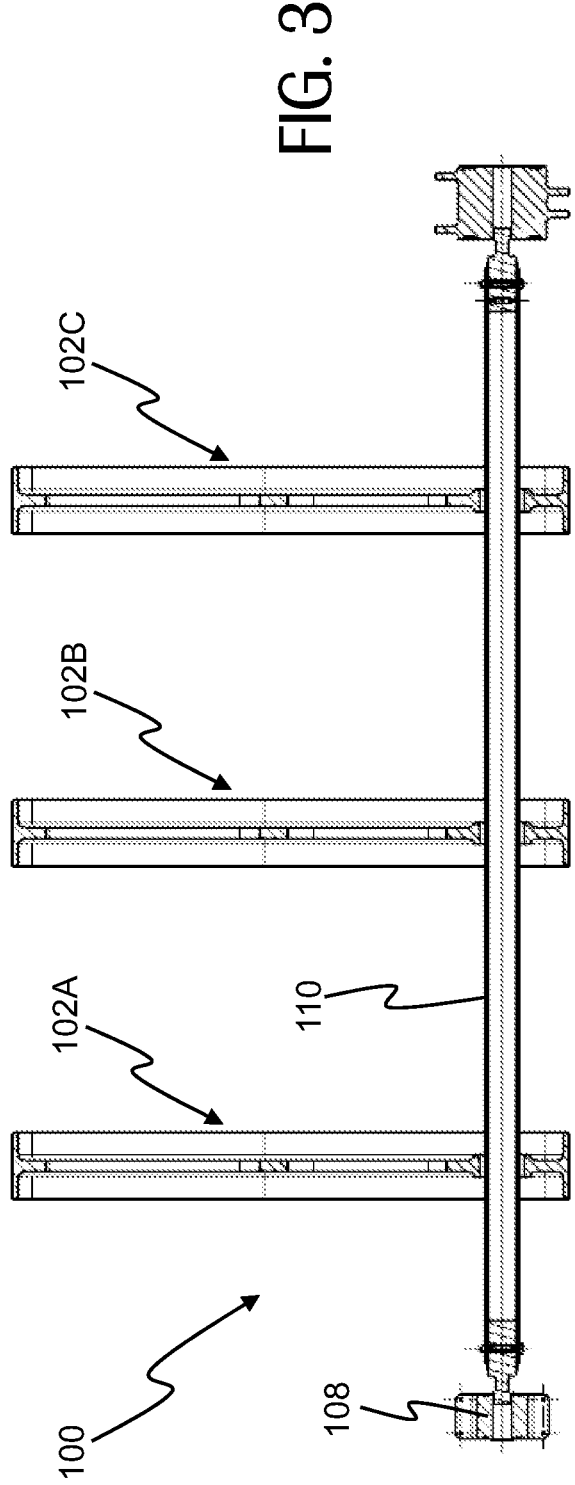
FIG. 3 shows a cross-sectional view of the control surface actuation assembly according to the embodiment illustrated in FIG. 2.

As illustrated in FIGS. 1-3, in an embodiment, a control surface actuation assembly 100 includes three eccentric cam mechanisms 102A, 102B, 102C coupled with an aircraft control surface. The aircraft control surface controlled by the control surface actuation assembly 100 may be, but is not limited to, a wing flap, an aileron, an elevator, a slat, or a rudder.

A gearbox 104, or other suitable gearing arrangement, is connected via a torque shaft assembly 110 to the eccentric cam mechanisms 102A, 102B, 102C. The gearbox 104 is arranged to receive an output shaft 106 from a power drive unit 108 and to transmit rotational drive to the torque shaft assembly 110. The gearbox 104 is operable to increase, decrease, or maintain the speed of the rotational drive from the power drive unit 108. The power drive unit 108 may be, but is not limited to, a hydraulic power drive unit or an electric power drive unit. Each adjacent eccentric cam mechanism 102 is coupled to one another via the torque shaft assembly 110. Rotational drive from the gearbox 104 is transmitted to each of the eccentric cam mechanisms 102A, 102B, 102C that together form a single actuator. In an embodiment, multiple eccentric cam mechanisms 102 are drivably connected via multiple torque shaft assemblies 110.

A challenge in designing a control surface actuation assembly is the limited envelope available to accommodate lateral deflections of a conventional torque shaft. Vibration and high rotational speeds can cause the center of the conventional torque shaft to deflect laterally and contact the supporting vehicle structure. Traditionally, a bearing has been located at the mid-span to minimize the torque shaft lateral deflection. However, in many cases there is no convenient location to mount this bearing to the supporting vehicle structure. Another challenge is conventional torque shaft torsional deflection. Even with a conventional mid-span bearing, torque shaft twist can adversely affect the control surface actuation assembly position accuracy and control. Conventional torque shaft designs deflect to some degree under loading.

Figure 4:
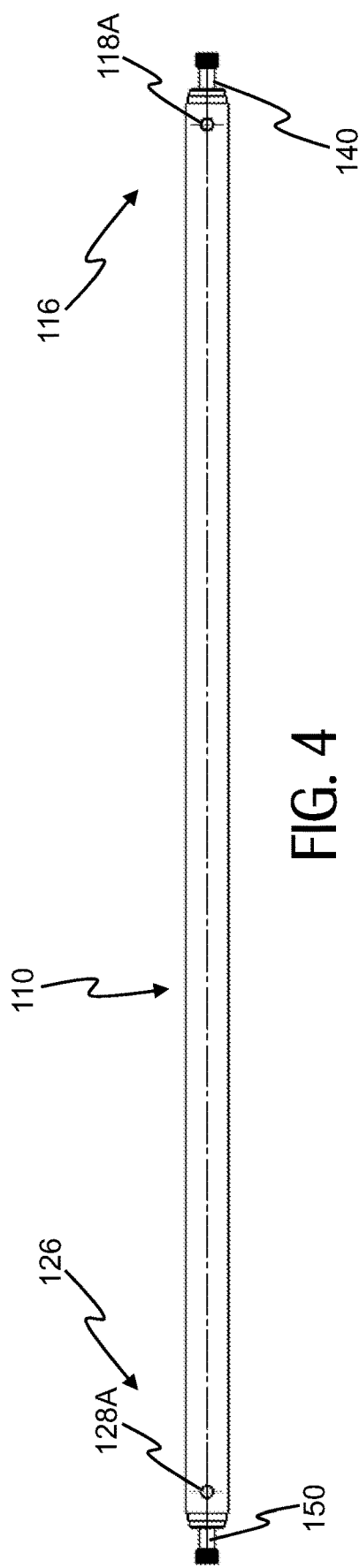
FIG. 4 shows a torque shaft assembly according to an embodiment of the present disclosure.
Figure 5:
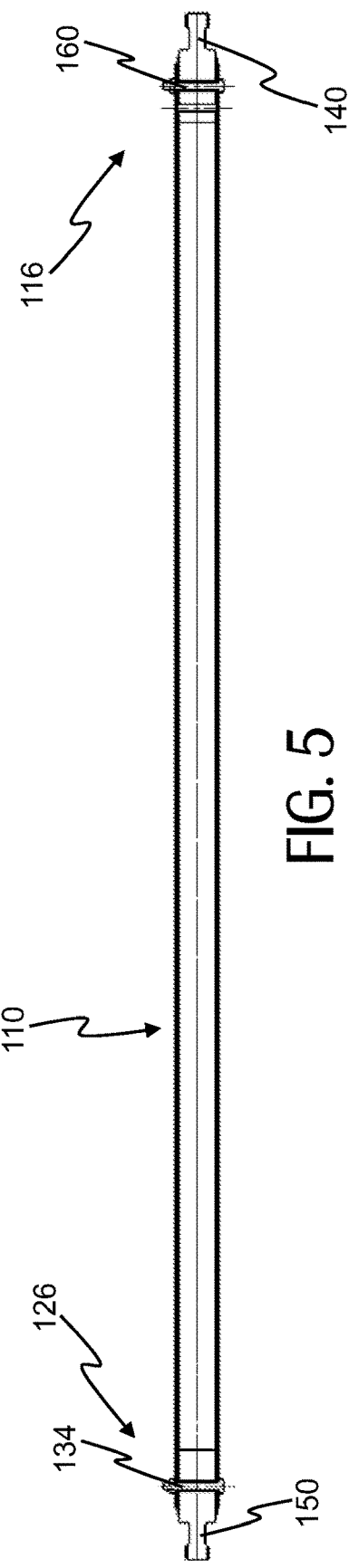
FIG. 5 shows a cross-sectional view of the torque shaft assembly according to the embodiment illustrated in FIG. 4.

The torque shaft assembly 110 is preloaded and does not deflect axially, torsionally, or laterally under applied loads. As illustrated in FIGS. 4-8, the torque shaft assembly 110 includes first and second concentric tubes 112, 114 that are preloaded in torsion and/or tension or compression to achieve a torsional and/or axial preload. In an embodiment, the two concentric tubes 112, 114 are generally hollow cylindrical shafts. The second tube 114 is located at least partially within the first tube 112. As illustrated in FIGS. 4-5, in an embodiment, the second tube 114 extends through the first tube 112. Referring now to FIGS. 6-8, in an embodiment, at a torque shaft assembly first end 116 the first tube 112 is provided with pin holes 118A, 118B and the second tube 114 is provided with pin holes 120A, 120B. The pin holes 118A, 118B share a common axis 122, and the pin holes 120A, 120B share a common axis 124. During assembly, when the second tube 114 is inserted into the first tube 112, the pin hole axes 122, 124 are axially-offset a distance x and radially-offset a distance y. At a second end 126 of the torque shaft assembly 110 the first tube 112 is provided with pin holes 128A, 128B and the second tube 114 is provided with pin holes 130A, 130B. During assembly, when the second tube 114 is inserted into the first tube 112, the pin holes 128A, 128B, 130A, 130B share a common axis 132.

In an embodiment, the second tube 114 comprises a greater length than the first tube 112 such that when assembled, the first and second end of the second tube 114 extend beyond the first and second ends of the first tube 112. A first end-coupling 140 is located at the first end 116 of the torque shaft assembly 110 and is at least partially located within the second tube 114. A second end-coupling 150 is located at the second end 126 of the torque shaft assembly 110 and is at least partially located within the second tube 114. In an embodiment, a radially outer surface of both the first and second end-couplings 140, 150 abuts the radially inner surface of the second tube 114. For example, the first and second end-couplings 140, 150 may be coupled with the second tube 114 via an interference fit.

The first and second end-coupling 140, 150 include a generally cylindrical body portion 142, 152 at least partially located within the second tube 114. First and second pin holes 144, 146 are located through the first end-coupling body portion 142. A first pin 148 is located at least partially through pin holes 120C, 120D in the second tube 114 and through the first pin hole 144 whereby the first end-coupling 140 is rotationally and axially fixed with the first end of the second tube 114. Third and fourth pin holes 154, 156 are also located through the second end-coupling body portion 152. A second pin 158 is located at least partially through pin holes 130C, 130D in the second tube 114 and through the third pin hole 154 whereby the second end-coupling 150 is rotationally and axially fixed with the second end of the second tube 114. The ends of the first and second pins 148, 158 may be flush with the radially outer surface of the second tube 114.

In an embodiment, once the first and second tubes 112, 114 and one, or both, of the first and second end-coupling 140, 150 have been assembled, a third pin 134 is inserted through the torque shaft assembly second end pin holes 128A, 128B, 130A, 130B. The third pin 134 may comprise a head 134A and a shank 134B. In an embodiment, the shank 134B includes a threaded portion 134C extending at least partially beyond the radially outer surface of the first tube 112 when assembled. A nut 136 is engaged with the third pin threaded portion 134C to retain the position of the third pin 134 relative to the first and second tubes 112, 114.

In an embodiment, axial and torsional preloads are created in the torque shaft assembly 110 by rotationally and axially securing the second end coupling 150 against movement. The first tube 112 is then twisted and/or pulled (i.e., is subjected to a torsional and/or tensile load) to align the first tube pin holes 118A, 118B with the second tube pin holes 120A, 120B and the first end-coupling second pin hole 146. A fourth pin 160 is then inserted through the aligned pin holes 118A, 118B, 120A, 120B, 146 to hold the first and second tubes 112, 114 in the stressed state. The fourth pin 160 may include a head 160A, a shank 160B, and a threaded portion 160C operable to engage a nut 160D. A sleeve 162 may be located about the fourth pin shank 160B. The sleeve 162 may also be referred to as a bushing and may be formed of a material such as, but not limited to, nylon, polyurethane, or brass. In an embodiment, the axial preload is created by compression of the first tube 112.

In an embodiment, a layer of adhesive 164 is applied in the gap between the outside diameter of the second tube 114 and the inside diameter of the first tube 112. The adhesive 164 provides additional rigidity to the torque shaft assembly 110 and secures the preload along the length of the torque shaft assembly 110. The adhesive 164 is sufficiently pliable to accommodate the local displacements between the first and second tubes 112, 114. The outer and inner diameters of the first and second tubes 112, 114, respectively, may be roughened or knurled to promote effective adhesion.

In an embodiment, the second tube 114 is a generally non-hollow/solid shaft. In an embodiment, the first and second end-couplings 140, 150 and the second tube 114 are an integral and unitary component of the torque shaft assembly 110.

In an embodiment, the axial and torsional preloads applied to the torque shaft assembly 110 are more than the operating load, which occurs at high speeds, but less than the limit load, which typically occurs at low speeds (i.e., stall torque). The preload limits the axial and lateral deflection during operation, when divergence is greatest, but does not limit deflection during stall torque when shaft whirling is not as much of a concern. By intelligently setting the preload range, the preload stress can be minimized thereby minimizing the weight of the torque shaft assembly 110.

Figure 9:
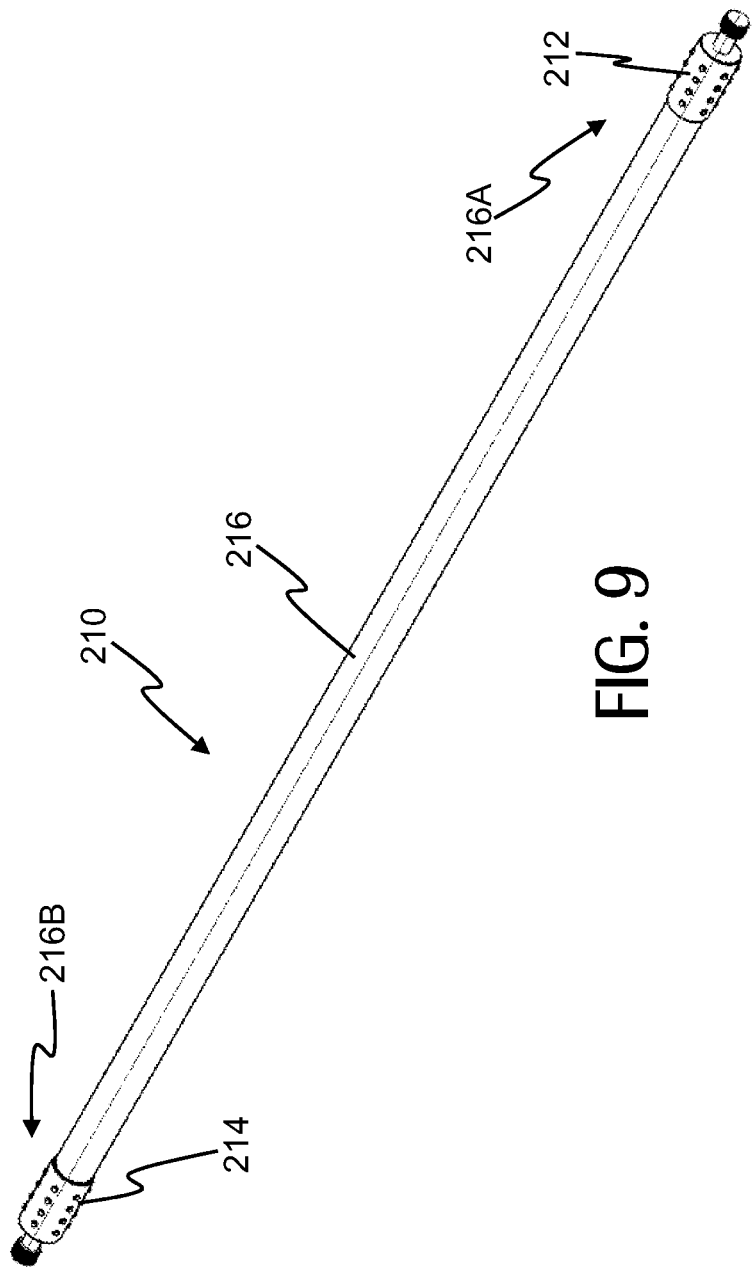
FIG. 9 shows a torque shaft assembly according to another embodiment of the present disclosure.

As illustrated in FIGS. 9-11, in another embodiment, a composite torque shaft assembly 210 is wrapped such that a preload is selectively built therein. The torque shaft assembly 210 includes a first end-coupling 212, a second end-coupling 214, and a tube 216 having a first end 216A and a second end 216B. The first end-coupling 212 is located at the tube first end 216A, and the second end-coupling 214 is located at the tube second end 216B. In an embodiment, the tube 216 comprises a metal or metal alloy. In another embodiment, the tube 216 is a manufactured lattice having strong compressive force resistance. Because the torsional load applied to the torque shaft assembly 210 is resisted by the composite wrap 236A (described in further detail below), the tube 216 is not required to have great torsional strength.

The first and second end-couplings 212, 214 are substantially similar. The first end-coupling includes a body 218 defining a bore 220. During assembly, a portion of the tube 216 is inserted into the first end-coupling bore 220. The opposite end of the tube 216 is similarly inserted into the bore of the second end-coupling 214. Additionally, a plurality of generally cylindrical projections 224 are located on a radially outer surface 222 of the first end-coupling body 218. The cylindrical projections 224 are operable to facilitate and retain winding one or more filaments or fibers 230, 232, 234 about the tube 216, forming one or more composite wraps 236A, 236B.

In an embodiment, the tube 216 is subjected to a predetermined torque (i.e., torsionally loaded) and a first composite wrap 236A, comprising fibers 230, 232, is applied thereto. While the tube 216 is under the torsional load, the fibers 230 are wound about the first and second end-couplings 212, 214 and the tube 216 in a first helical direction. Similarly, while the tube 216 is under the torsional load, the fibers 232 are wound about the first and second end-couplings 212, 214 and the tube 216 in a second helical direction. The first composite wrap 236A is then cured while the torsional preload is still applied.

In an embodiment, the tube 216 is also subjected to a predetermined compressive force (i.e., compressive loading) and a second composite wrap 236B, comprising fibers 234, is applied thereto. While the tube 216 is under the compressive load, the fibers 234 are wound about the first and second end-couplings 212, 214 and the tube 216 in an axial direction. The second composite wrap 236B is then cured while the compressive preload is still applied. After curing the second composite wrap 236B, the compressive load is removed and the second composite wrap 236B will resist the axial expansion of the tube 216.

In another embodiment, the second composite wrap 236B is applied to the first and second end-couplings 212, 214 and the tube 216 and cured before an axial compressive load is introduced to the tube 216. In this embodiment, the axial preload is introduced by expanding the length of the tube 216 via a threaded inner cap.

The axial preload is applied along the fiber 234 direction at zero-degree ply angle. Therefore, the fibers 234 are loaded in tension, rather than the polymeric matrix material of the second composite wrap 236B being loaded in shear.

Axial compression of the tube 216 balances the axial tension in the axial composite fibers 234 to prevent or mitigate lateral deflection. This heightened stress state increases the threshold lateral load necessary to initiate lateral deflection of the torque shaft assembly 210. The lateral load is typically a result of an acceleration load, a vibration load, or a centrifugal whirling load. The induced lateral load results from the torque shaft assembly center of gravity being offset from the center of rotation. As the rotational velocity of a conventional torque shaft increases, the torque shaft bends and induces a higher stress state therein. At a velocity dependant on torque shaft diameter, length, and rotational velocity the conventional torque shaft center of gravity will move laterally unrestrained. Historically, torque shafts are straightened to ensure that the centers of gravity and rotation are as aligned as economically possible. The axial preload of the torque shaft assemblies 110, 210 described herein creates a threshold lateral whirling load that must be reached before the torque shaft assemblies 110, 210 will begin to deflect laterally. The axial preload results in higher safe-operating speeds, and less vibration below the threshold speed, of the torque shaft assemblies 110, 210.

Because the axial preload may dissipate at elevated temperatures as the polymeric matrix material of the second composite wrap 236B becomes more elastic, in an embodiment, the tube 216 comprises a first coefficient of thermal expansion and the first and second composite wraps 236A, 236B comprise a second coefficient of thermal expansion. Selecting different coefficients of thermal expansion for the tube 216 and the composite wraps 236A, 236B offsets the effect of the polymeric matrix material thereof becoming more elastic at elevated temperatures. In an embodiment, the first and second coefficients of thermal expansion are selected such that as the temperature of the tube 216 is increased, the tube 216 length will increase faster than the composite wraps 236A, 236B become elastic, thus inducing a strain between the tube 216 and the composite wraps 236A, 236B.

Because extremely cold temperatures will cause the tube 216 having a first coefficient of thermal expansion to shrink/contract more quickly than the first and second composite wraps 236A, 236B having a second coefficient of thermal expansion, in an embodiment, the torque shaft assembly 210 includes an axial spring pack to maintain the axial preload in extremely cold temperatures.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An aircraft flight surface actuation system, comprising:
   a motor having an output shaft;
   a gearbox coupled with said output shaft, whereby a first driving force output via said motor is converted to a second driving force;
   a torque shaft assembly driveably coupled with said gearbox, wherein said torque shaft comprises:
      a first tube; and
      a second tube located at least partially through said first tube and located coaxial therewith, wherein said second tube is configured to axially preload said first tube, wherein said second tube comprises a greater length than said first tube prior to application of said axial preload, wherein said axial preload is configured to mitigate lateral deflection of said first tube, and
      wherein said second tube is configured to a torsionally preload said first tube, wherein said torsional preload is configured to mitigate torsional deflection of said first tube,
      wherein a relative position of said first tube and said second tube is secured after said axial preload and said torsional preload are applied;
   an eccentric cam mechanism driveably coupled with said torque shaft assembly; and
   a flight surface coupled with said eccentric cam mechanism.

2. The aircraft flight surface actuation system according to claim 1, said torque shaft assembly further comprising:
   a first hole located through a radially outer and a radially inner surface of said first tube, wherein said first hole is positioned adjacent to a first end of said torque shaft assembly;
   a second hole located through said radially outer and inner surfaces of said first tube, wherein said second hole is coaxial with said first hole about a first axis arranged at a first distance from said first end;
   a third hole located through a radially outer and a radially inner surface of said second tube, wherein said third hole is positioned adjacent to said first end of said torque shaft assembly; and
   a fourth hole located through said radially outer and inner surfaces of said second tube, wherein said fourth hole is coaxial with said third hole about a second axis arranged at a second distance from said first end;
   wherein coaxial alignment of said first axis and said second axis creates said axial preload in said first tube, and wherein said relative position of said first tube and said second tube is at least partially secured via a pin located at least partially through said first, second, third, and fourth holes.

3. The aircraft flight surface actuation system according to claim 2, wherein said first axis and said second axis are radially-offset, wherein coaxial alignment of said first and third holes creates said torsional preload in said first tube.

4. The aircraft flight surface actuation system according to claim 2, wherein said pin is a first pin, said torque shaft assembly further comprising:
   a fifth hole located through said radially outer and inner surfaces of said first tube, wherein said fifth hole is positioned adjacent to a second end of said torque shaft assembly;
   a sixth hole located through said radially outer and inner surfaces of said first tube, wherein said sixth hole is coaxial with said fifth hole;
   a seventh hole located through said radially outer and inner surfaces of said second tube, wherein said seventh hole is positioned adjacent to said second end of said torque shaft assembly; and
   an eighth hole located through said radially outer and inner surfaces of said second tube, wherein said eighth hole is coaxial with said seventh hole; and
   a second pin located at least partially through said fifth, sixth, seventh, and eighth holes.

5. The aircraft flight surface actuation system according to claim 1, wherein an adhesive located between a radially inner surface of said first tube and a radially outer surface of said second tube is configured to at least partially secure said axial preload.

6. The aircraft flight surface actuation system according to claim 5, wherein said first tube radially inner surface and said second tube radially outer surface each comprise a plurality of ridges operable to increase adhesion.

7. The aircraft flight surface actuation system according to claim 1, wherein said second tube is configured such that:
   said axial preload is greater than said second driving force and less than a limit load of said torque shaft assembly; and
   said torsional preload is greater than said second driving force and less than said limit load of said torque shaft assembly.

8. The aircraft flight surface actuation system according to claim 1, wherein said second tube comprises a non-hollow shaft.

9. The aircraft flight surface actuation system according to claim 1, further comprising:
   a first end-coupling at least partially located within said second tube and connected with said first tube and said second tube; and a second end-coupling at least partially located within said second tube opposite said first end-coupling and connected with said first tube and said second tube.

\* \* \* \* \*

UNITED STATES PATENT AND TRADEMARK OFFICE
CERTIFICATE OF CORRECTION

PATENT NO. : 12,151,803 B2
APPLICATION NO. : 17/612622
DATED : November 26, 2024
INVENTOR(S) : Christopher A. Moore Page 1 of 1

It is certified that error appears in the above-identified patent and that said Letters Patent is hereby corrected as shown below:

On the Title Page

Please add Item (60) —Provisional application No. 62/851,349, filed on May 22, 2019.—

Signed and Sealed this
Eleventh Day of February, 2025

Coke Morgan Stewart
*Acting Director of the United States Patent and Trademark Office*